United States Patent
Ibanez et al.

(10) Patent No.: US 12,493,846 B2
(45) Date of Patent: Dec. 9, 2025

(54) CURTAILING A CARBON FOOTPRINT TO ACHIEVE CARBON REDUCTION GOALS

(71) Applicant: Inventus Holdings, LLC, Juno Beach, FL (US)

(72) Inventors: Mario Daniel Ibanez, Jupiter, FL (US); David W. Abel, Minneapolis, MN (US); Stephan Ulrich Nitsche, Wellington, FL (US); Michael J. Haass, Minneapolis, MN (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 339 days.

(21) Appl. No.: 18/184,243

(22) Filed: Mar. 15, 2023

(65) Prior Publication Data
US 2024/0311733 A1  Sep. 19, 2024

(51) Int. Cl.
*G06Q 10/0637* (2023.01)
*G06Q 10/067* (2023.01)
*G06Q 50/06* (2024.01)

(52) U.S. Cl.
CPC ..... *G06Q 10/06375* (2013.01); *G06Q 10/067* (2013.01); *G06Q 50/06* (2013.01)

(58) Field of Classification Search
CPC . G06Q 10/06375; G06Q 10/067; G06Q 50/06
See application file for complete search history.

(56) References Cited

U.S. PATENT DOCUMENTS

| | | | |
|---|---|---|---|
| 8,000,938 B2 | 8/2011 | Mcconnell | |
| 2014/0058572 A1* | 2/2014 | Stein | G06Q 50/06 |
| | | | 700/291 |
| 2022/0164273 A1 | 5/2022 | Jin | |
| 2023/0085641 A1* | 3/2023 | Jones | G05B 15/02 |
| | | | 700/275 |

FOREIGN PATENT DOCUMENTS

| | | |
|---|---|---|
| AU | 2011241885 C1 | 10/2011 |
| CA | 2694988 C | 4/2010 |

OTHER PUBLICATIONS

Aryai, et al., Controlling Electricity Storage to Balance Electricity Costs and Greenhouse Gas Emissions in Buildings, 5 Energy Informatics 11 (2022) (Year: 2022).*

* cited by examiner

*Primary Examiner* — Charles Guiliano
(74) *Attorney, Agent, or Firm* — Tarolli, Sundheim, Covell & Tummino LLP

(57) ABSTRACT

Computer readable instructions for operations that cause a processor to receive, by a remote recommendation server, a request comprising requestor information characterizing a site of a plurality of sites. The operations cause the processor to receive, by a site database, the requestor information, wherein the site database stores historical data characterizing the plurality of sites over time. The operations also cause the processor to receive, a recommendation engine, the requestor information and generate, by the recommendation engine, a set of plans to curtail the carbon footprint of the site based on the requestor information. The operations further cause the processor to simulate, by the recommendation engine, execution of the set of plans to curtail the carbon footprint of the site and select, by the recommendation engine, a plan of the set of plans to curtail the carbon footprint of the site.

20 Claims, 4 Drawing Sheets

REQUESTOR INFORMATION 200

- BUDGET 210
- TYPE OF ASSETS 215
- NUMBER OF ASSETS 220
- PER YEAR POWER ALLOCATION 225
- AMOUNT OF FUEL CONSUMED 230
- AMOUNT OF FUEL PURCHASED 235
- SIZE OF SITE (SQUARE METERS) 240
- LOCATION 245
- POWER SOURCES 250
- TYPE OF SITE 255

FIG. 2

CURTAILING A CARBON FOOTPRINT TO ACHIEVE CARBON REDUCTION GOALS

TECHNICAL FIELD

The present disclosure relates to a recommendation engine for implementing operations to reduce carbon emissions.

BACKGROUND

A carbon footprint is the total greenhouse gas (GHG) emissions caused by an individual, event, organization, service, place or product, expressed as carbon dioxide equivalent (CO2e). Greenhouse gases, including the carbon-containing gases carbon dioxide and methane, can be emitted through the burning of fossil fuels, land clearance and the production and consumption of food, manufactured goods, materials, wood, roads, buildings, transportation, and other services. In most cases, the total carbon footprint cannot be calculated exactly because of inadequate knowledge of data about the complex interactions between contributing processes, including the influence of natural processes that store or release carbon dioxide.

SUMMARY

One example relates to a non-transitory computer readable medium storing computer readable instructions for operations that cause a processor executing the operations to receive, by a remote recommendation server, a request comprising requestor information characterizing a site or a plurality of sites, the requestor information including a size of the site and type of site. The operations also cause the processor to receive, by a site database, the requestor information, wherein the site database stores historical data characterizing the plurality of sites over time and to receive, a recommendation engine, the requestor information. The operations cause the processor to generate, by the recommendation engine, a set of plans to curtail a carbon footprint of the site based on the requestor information and simulate, by the recommendation engine, execution of the set of plans to curtail the carbon footprint of the site. Further, the operations cause the processor to select, by the recommendation engine, a plan of the set of plans to curtail the carbon footprint of the site.

Another example relates to a system that includes a site of a plurality of sites having energy consuming equipment and a plurality of energy sources that impact a carbon footprint of the site. The energy sources of the site further include direct energy sources that contribute directly to the carbon footprint of the site, the direct energy sources including fuel and a battery bank. The energy sources of the site also include indirect energy sources that contribute indirectly to the carbon footprint of the site, the indirect energy sources including a power grid and a power generator. The system also includes a remote recommendation server executing on a computing platform that provides a graphical user interface (GUI) to a requestor client and receives requestor information from a requestor in response to the requestor interacting with the GUI. The system includes a site database executing on the computing platform that stores the requestor information and historical data characterizing the plurality of sites. The system also includes a recommendation engine executing on the computing platform that generates a set of plans to curtail the carbon footprint of the site based on the requestor information. The recommendation engine also simulates execution of a set of plans to curtail the carbon footprint of the site, wherein at least one plan of the set of plans is selected and provided to the requestor client via the GUI.

Still another example relates to a method for determining a plan to curtail a carbon footprint. The method includes receiving, by a remote recommendation server executing on a computing platform, a request comprising requestor information characterizing a site from a requestor client. The method also includes storing, by the remote recommendation server, the requestor information in a site database. The method further includes obtaining, by a recommendation engine executing on the computing platform, building characteristics of the site from requestor information stored in the site database. The method includes estimating, by the recommendation engine, energy disaggregation to determine energy sources of power consumed at the site. The method still further includes determining, by the recommendation engine, a cost and load impact of demand response and energy consuming equipment at the site. The method also includes generating, by the recommendation engine a set of plans characterizing energy use of the energy consuming equipment at the site to curtail a carbon footprint of the site based on the requestor information, the energy disaggregation and the demand response. The method includes simulating execution, by the recommendation engine, the set of plans at the site. The method further includes estimating, by the recommendation engine, a solar panel layout and parameters and determining, by the recommendation engine, energy costs and usages of the site in response to curtail energy use of the energy consuming equipment at the site. The method yet further includes selecting, by the recommendation engine, a plan of the set of plans that curtails the carbon footprint of the site.

BRIEF DESCRIPTION OF THE DRAWINGS

FIG. 2 illustrates an example of requestor information for a site.

DETAILED DESCRIPTION

Figure 1:
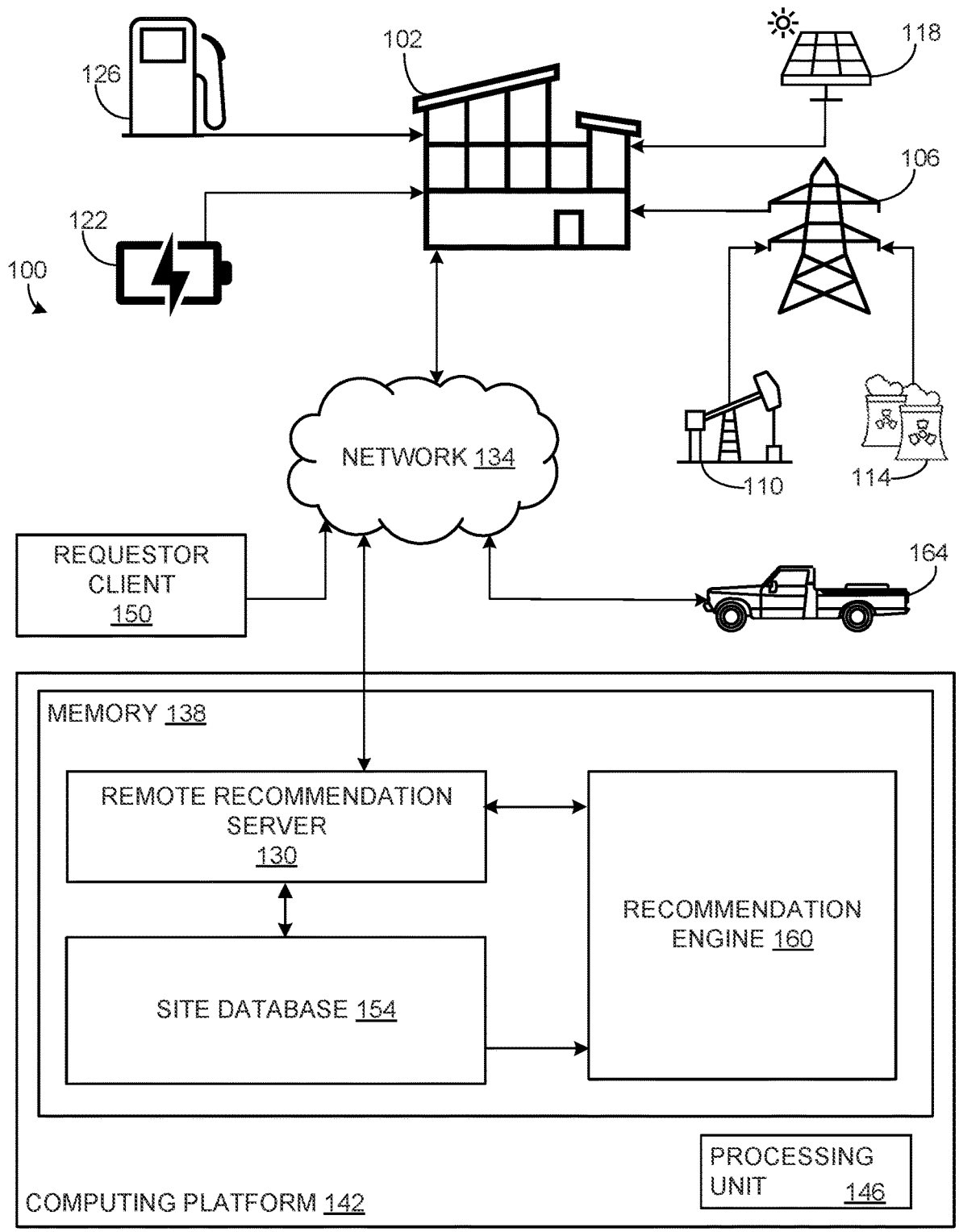
FIG. 1 illustrates an example of a recommendation engine operating on a computing platform for generating plans to reduce a carbon footprint at a site.

The present disclosure relates to systems and methods for recommending a plan to reduce carbon emissions at a given site. The given site can include energy consuming equipment, such as lighting, heating ventilation and air conditioning (HVAC), utility equipment, machinery, and appliances. The given site can further receive energy from energy sources, such that the energy consuming equipment can receive energy from a power grid or local power generation equipment. That is, the given site can include solar panels, battery backups, and generators. The given site can further receive energy from nuclear energy, natural gas, and coal. Energy received from various sources, such as natural gas and coal, contributes to a carbon footprint for the given site because natural gas and coal require emission of carbon to create energy provided to the given site. In comparison, solar panels do not emit carbon to create energy, although manufacturing solar panels may require emission of carbon. Accordingly, the carbon footprint for the given site can be a function of energy consumption of the energy consuming equipment and the source of the energy. Moreover, carbon emissions can be reduced by replacing and/or altering operations of the energy consuming equipment, as well as reducing and/or altering the sources of energy.

In an example, the given site is one of hundreds or thousands of sites. The given site can have unique attributes characterized by data that can be employed to determine a plan for reducing carbon emissions of the given site. Accordingly, a single plan implemented across a plurality of sites may not be viable for each site, such that the given site can have a unique plan compared to the plurality of sites. Additionally, energy consumption at the given site can change over time (e.g., months and years), as climate and environmental factors can impact energy consumption of HVAC, change in daylight can impact energy consumption of lighting, and the specific utilities (e.g., machinery and equipment) of the given site can have varying needs over time that can impact energy consumption.

A recommendation engine can receive a request from a graphical user interface (GUI) characterizing reduction of a carbon footprint and/or an increase in power consumption, as well as a budget. In response to the request, the recommendation engine can recommend a plan and corresponding operations at the given site to reduce the carbon footprint based on data associated with the given site. Furthermore, the recommendation engine can recommend the plan and corresponding operations based on data associated with other sites and extrapolated to the given site. The plan can include adjusting demand response at the given site, adding an energy source (e.g., solar panels), replacing energy consuming equipment (e.g., lighting), adding or modifying a virtual power purchasing agreement, and purchasing carbon offset credits. The recommended plan can be provided to the GUI. In some examples, the recommendation engine can automatically instantiate the recommended plan, or some portion thereof. Furthermore, the recommendation engine can generate a set of plans and provide the set of plans to the GUI.

FIG. 1 illustrates a recommendation system 100 for recommending a plan for curtailing a carbon footprint of a site 102. The site 102 can be an industrial building, such as a manufacturing plant. In other examples, the site 102 can be a residential or commercial building. Moreover, the site 102 is one of a plurality of sites. The plurality of sites can include hundreds or thousands of sites that can include industrial, residential, and commercial buildings. The site 102 can be coupled to a power grid 106, such that the site 102 can receive electricity from the power grid 106. Furthermore, the power grid 106 can be coupled to electric power sources such as an oil-fired generating plant 110 and a nuclear generation plant 114. The site 102 can also receive power from solar panels 118 that are coupled to the site 102. That is, the solar panels 118 can be located proximal to the site 102, such as on a roof of the site 102 or in a nearby field. Alternatively, the solar panels 118 can be coupled to the site 102 via the power grid 106, similar to the oil-fired generating plant 110 and the nuclear generation plant 114.

Additionally, the site can be coupled to a battery bank 122 that stores electricity that can be provided to the site 102. The site 102 can further receive energy from fuel 126 powered energy sources, such as a generator. The fuel 126 can include propane, gasoline, and fuel gases. Energy sources that provide electricity to the site 102 can include the generator, the battery bank 122, the power grid 106, and the solar panels 118. Electricity provided by energy sources that provide electricity to the site 102 can be measured, such that the impact on the carbon footprint of the site 102 of the electricity provided directly to the site 102 can be calculated as a function of how much energy has been provided to the site 102 and the type of energy source that provided the energy. Accordingly, the carbon footprint of the site 102 is indirectly impacted by a given energy source that provides electricity to the site 102. The site 102 can also include equipment and/or operations that directly impact the carbon footprint of the site 102. For example, the fuel 126 can be used by automobiles and equipment, such as welding torches. Automobiles and equipment directly impact the carbon footprint of the site 102 by burning the fuel 126.

Electricity at the site 102 is consumed by energy consuming equipment, such as heating, ventilation, and air conditioning (HVAC) and lighting. Moreover, electricity at the site 102 can receive power from energy sources that directly provide electricity to the site 102, such as the power grid 106 and solar panels 118. Accordingly, the energy consuming equipment of the site 102 impact the carbon footprint when consuming energy provided from the energy sources.

The site 102 can provide data characterizing energy consuming equipment and energy consumed by the site 102 to a remote recommendation server 130 via a network 134. The network 134 can be a point-to-point network, such as a cellular network or a WiFi network. In examples where the network 134 is a cellular network, the cellular network can be implemented with a 3G network, a 4G Long-Term Evolution (LTE) network, a 5G network, etc. The network 134 can also be connected via fiber physical connection such as fiber optic. Network data characterizing the network 134 can be stored on data lakes and data warehouse in the cloud.

The remote recommendation server 130 can be stored in a memory 138 of a computing platform 142. The memory 138 of the computing platform 142 can store machine readable instructions. The memory 138 could be implemented, for example, as non-transitory computer readable medium, such as volatile memory (e.g., random access memory), nonvolatile memory (e.g., a hard disk drive, a solid state drive, flash memory, etc.) or a combination thereof. The computing platform 142 can include a processor 146 that can access the memory 138 and execute the machine-readable instructions. The processor 146 can include, for example, one or more processor cores. The computing platform 142 can include a network interface configured to communicate with the network 134. The network interface could be implemented, for example, as a network interface card.

Further, the computing platform 142 could be implemented in a computing cloud. The computing cloud can include real time (e.g., within 10 seconds) bi-directional access and cyber security handshaking. In such a situation, features of the computing platform 142, such as the processor 146, the network interface, and the memory 138 (and/or other medium) could be representative of a single instance of hardware or multiple instances of hardware with applications executing across the multiple of instances (i.e., distributed) of hardware (e.g., computers, routers, memory, processors, or a combination thereof). Alternatively, the computing platform 142 could be implemented on a single dedicated server.

The remote recommendation server 130 can provide a requestor client 150 with a graphical user interface (GUI) for a requestor to provide requestor information. In some examples, the requestor client 150 can be located at the site 102. The GUI can include a plurality of selectable elements that are representative of data characterizing energy consumption of the site 102. Moreover, the GUI can include a plurality of fields for a requestor to input data characterizing energy consumption of the site 102.

FIG. 2 illustrates an example of requestor information 200 that can be provided to the requestor client 150 of FIG. 1. Requestor information can include a budget 210 for implementing a plan. The budget 210 is a cost that is not to be exceeded to implement a plan for a site, such as the site 102 of FIG. 1. The cost of the plan can be impacted by the amount of energy and the source of energy consumed by the site. The requestor information 200 can also include types of assets 215, which can be energy consuming equipment. For example, different types of assets at the site can be manufacturing equipment, lighting, HVAC equipment, and automobiles. Accordingly, the requestor information 200 can include a number of assets 220, such as a quantity for lighting (e.g., 100 fluorescent light bulbs) and/or a number of manufacturing machines.

Additionally, the requestor information 200 can include a per year power allocation 225 for the site. The per year power allocation 225 is an estimate of the amount of power consumed by the site based on how much power the site has previously consumed. The requestor information 200 can also include an amount of fuel consumed 230, such as the fuel 126 of FIG. 1, as well as an amount of fuel purchased 235.

The requestor information 200 can further include a size of site (e.g., in square meters, square miles, acreage, etc.) 240 and a location 245 of the site. Moreover, the requestor information 200 can include power sources 250, such as the electric power sources of FIG. 1 including, but not limited to the power grid 106, the oil-fired generating plant 110, nuclear generation plant 114, solar panels 118, and battery bank 122 of FIG. 1. Power sources 250 of the requestor information 200 can also include how much power is provided to the site by each power source 250. Additionally, the requestor information can include the type of site 255. For example, a type of site 255 can be a commercial building, industrial building, or residential building. The type of site 255 can also be more specific, such as a hospital, grocery store, or office space.

Referring back to FIG. 1, the remote recommendation server 130 can receive a request including requestor information characterizing the site 102 from the requestor client 150. In response to receiving the requestor information from the requestor client 150, the remote recommendation server 130 can provide the requestor information to a site database 154. The site database 154 can store historical data of the site 102, such as the requestor information over time. Additionally, the site database 154 can store historical data of the plurality of sites. Furthermore, the site database 154 can store data characterizing carbon emissions of electric power sources, as well as energy costs for fabrication of equipment, such as the solar panels 118.

Moreover, the site database 154 can receive data characterizing carbon emissions and requestor information that is not included in the request received by the remote recommendation server 130. That is, the remote recommendation server 130 can receive requestor information in response to requesting the information from the requestor client 150 or another client. Particularly, the recommendation server 130 can retrieve data including requestor information about the site 102 via an Application Programming Interface (API). Therefore, requestor information that is not provided with the request or not readily available from the requestor can be retrieved by the remote recommendation server 130 from another client via an API.

The site database 154 can provide the requestor information of the site 102 to the recommendation engine 160. The recommendation engine 160 is configured to generate a plan to curtail the carbon footprint of the site 102 based on the requestor information. The carbon footprint calculated by the recommendation engine 160 considers carbon emissions that directly and indirectly impact the carbon footprint of the site 102. Again, carbon emissions that directly impact the carbon footprint of the site 102 are based on the amount of fuel 126 consumed at the site 102, such as fuel burned by a vehicle or equipment. Indirect emissions include the amount of power consumed by the site 102 and the energy source or method in which the power was generated. Accordingly, the recommendation engine 160 can calculate the carbon footprint of the site 102 as a function of the requestor information and data characterizing carbon emissions stored in the site database 154.

The recommendation engine 160 can also extrapolate historical data and carbon emissions of other sites to the historical data of the site 102. In an example, the requestor information can include per year power allocation (e.g., per year power allocation of FIG. 2) and size of site (e.g., size of site (square meters) of FIG. 2). Because power consumption and energy sources used at the site 102 can vary over the period of one year, the carbon footprint of the site 102 can vary over the period of one year. However, the requestor information may not have enough data to determine peak-times or when the site 102 consumes power from energy sources that have a greater impact on the carbon footprint of the site 102. Accordingly, the recommendation engine 160 can compare the site 102 to a similarly situated site to determine the carbon footprint at the site 102 on a per hour basis (hourly basis). That is, the site 102 and the similarly situated site can be of the same type (e.g., type of site 255 of FIG. 2). The site database 154 can store the power consumption of the similarly situated site on an hourly basis, whereas the power consumption of the site 102 is stored on a yearly basis. Therefore, the recommendation engine 160 can extrapolate the power consumption of the similarly situated site to the site 102 to determine the power consumed on an hourly basis and adjusted based on the differences in the size of the sites. In other examples, the power consumption of the site 102 on an hourly basis can be provided to the remote recommendation server 130 by the requestor client 150 and stored in the historical data of the site database 154.

The recommendation engine 160 can calculate the carbon footprint of the site 102 by determining at least how much power is consumed at the site at an hourly basis, the source of the power whether direct or indirect, and what energy consuming equipment (e.g., type of assets 215) are consuming the power. Therefore, the recommendation engine 160 can generate a set of plans to curtail the carbon footprint of the site 102. In response to generating a set of plans, the recommendation engine 160 can simulate execution of each plan to determine the impact that each plan has on the carbon footprint of the site 102.

Figure 3:
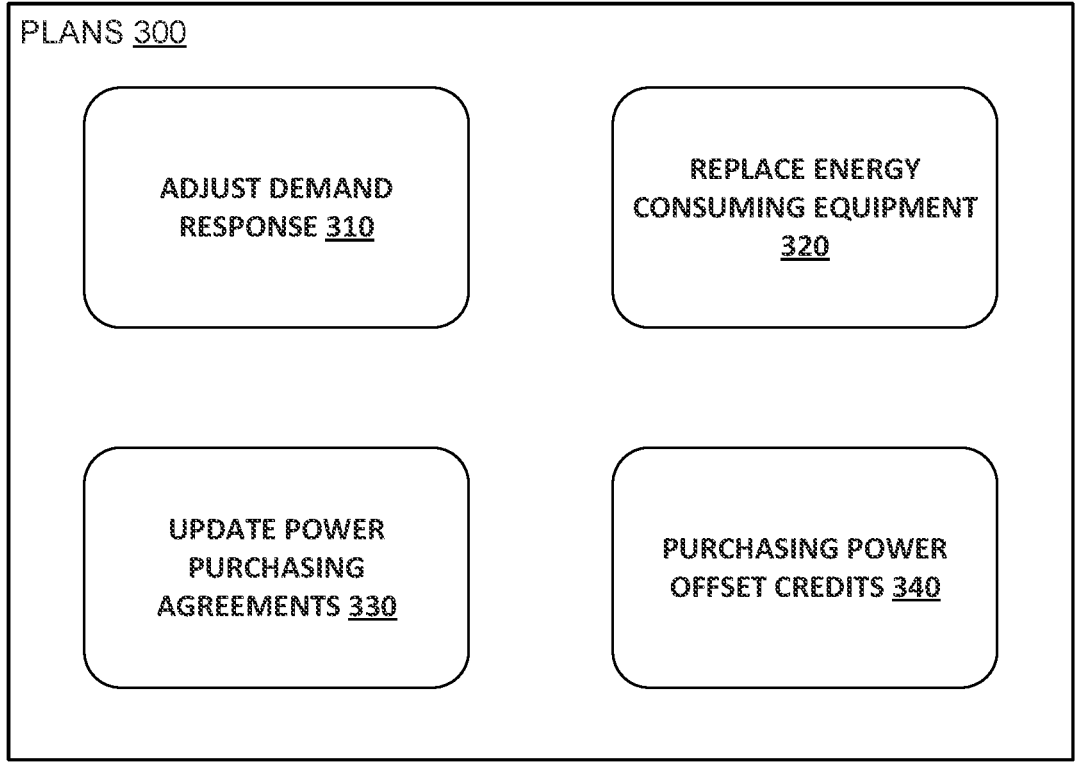
FIG. 3 illustrates an example plan to reduce a carbon footprint.

FIG. 3 illustrates an example set of plans 300 that are generated by a recommendation engine, such as the recommendation engine 160 of FIG. 1. The recommendation engine can generate a plan to adjust demand response 310 at a site (e.g., site 102 of FIG. 1) based on received requester information (e.g., requestor information 200 of FIG. 2) and a determination of power consumed on an hourly basis. A plan to adjust demand response 310 can include changing a power source (e.g., power sources 250 of FIG. 2) during specific intervals of time. For example, during peak time when demand for electricity supplied by a power grid (e.g., power grid 106 of FIG. 1) is highest, indirect carbon emissions associated with generating the power provided to the site can increase in response to the high demand. That is, the power grid can be supplying energy to the site from a power source with high carbon emissions (alternatively referred to as "intensity") (e.g., oil-fired generating plant 110 of FIG. 1) compared to a power source supplying energy during off-peak time (e.g., the nuclear generation plant 114 of FIG. 1). Therefore, the plan to adjust the demand response 310 can include changing the source of power during peak time from the power grid to solar panels (e.g., solar panels 118 of FIG. 1) and a battery bank (e.g., battery bank 122 of FIG. 1). Stated differently, in some examples, the plan to adjust demand response 310 can include discharging the battery bank such that the battery bank and the solar panels operate in concert to provide power to the site during the peak time. Conversely, in some instances of the plan to adjust demand response 310, during off-peak time, the solar panels can recharge the battery bank. Alternatively, the plan to adjust demand response 310 can include changing operations at the site, such as postponing operations that consume electricity at peak time to off peak time.

The recommendation engine can also recommend a plan to replace energy consuming equipment 320. A plan to replace energy consuming equipment 320 can include replacing lighting (e.g., types of assets 215 of FIG. 2), such as fluorescent light bulbs. Light emitting diodes (LED) bulbs consume about 20% less power than fluorescent light bulbs to provide a similar amount of lighting. By replacing fluorescent light bulbs with LED bulbs, a plan to replace energy consuming equipment 320 can reduce the amount of power consumed at the site and therefore curtail the carbon footprint of the site.

In some examples, a site can be coupled to a power grid, but the site can be missing solar panels. However, the recommendation engine can determine that a plan to adjust demand response 310 that includes receiving power from solar panels will reduce the carbon footprint of the site. Therefore, solar panels and/or additional power generating equipment are needed to instantiate the plan to adjust demand response 310. Accordingly, the recommendation engine can generate a plan to update a power purchase agreement 330. The power purchase agreement 330 is an agreement to purchase green energy generated by a third party for an agreed-upon price. The plan to update a power purchase agreement 330 can include updating an arrangement in which a third-party developer installs, owns and operates the solar panels.

In another example, the recommendation engine can generate a plan to purchase power offset credits 340. A power offset credit can be a transferrable, verified, and certified tradable instrument representing emission reduction of carbon. When a plan to adjust demand response 310 and/or replace energy consuming equipment 320 does not reach a goal of curtailing the carbon footprint of the site, a plan to purchase power offset credits 340 can be generated by the recommendation engine to reduce the carbon footprint of the site.

Referring back to FIG. 1, the recommendation engine 160 can generate and simulate the set of plans (e.g., the set of plans 300 of FIG. 3). That is, each plan of the set of plans can be executed with a simulation to determine a cost for implementing the plan, which is compared to the budget of the requestor information (e.g., budget 210 of requestor information 200 of FIG. 2). Additionally, each plan of the set of plans can be simulated to determine an impact on the carbon footprint of the site 102. The recommendation engine 160 can recommend a plan in response to simulating execution of each plan in the set of plans at the site 102. Therefore, the recommended plan can be the plan of the set of plans that curtails the carbon footprint of the site 102 and does not exceed the budget. Furthermore, the recommendation engine 160 can recommend a subset of the set of plans to curtail the carbon footprint of the site 102.

The recommendation engine 160 can provide the recommended plan to the requestor client 150 via the remote recommendation server 130. Accordingly, the requestor client 150 can display the recommended plan on the GUI to display to the requestor. In some examples, the requestor can approve or deny the recommended plan via user selectable elements of the GUI. Thus, the recommended plan can be implemented in response to approval by the requestor. In other examples, the recommended plan can be automatically approved by the recommendation engine 160.

In response to a recommended plan being approved, the plan can be executed. In an example, the plan is to adjust the demand response at the site 102. The plan can also include replacing energy consuming equipment such as lighting. Therefore, execution of the plan can include dispatching a maintenance crew 164 to replace lighting at the site 102. Additionally or alternatively, the recommendation engine 160 can implement a portion (or all) of the approved (selected) plan. More specifically, the recommendation engine 160 can control operations of a controller (or other device) causing the controller to replace power consumed at a peak time from an indirect source of power (e.g., the power grid 106) with a direct source of power (e.g., the battery bank 122). That is, the battery bank 122 can be discharged to the site 102, while the solar panels 118 continue to generate power during the peak time, such that the solar panels 118 and the battery bank 122 operate in concert to provide power to the site 102 during the peak time. Conversely, during off-peak time, the recommendation engine 160 can cause the controller to stop the discharge of the battery bank 122, such that the solar panels 118 recharge the battery bank 122. For instance, the recommendation engine 160 can provide commands to a controller (or other unit) to change a schedule of power providing devices, such as the battery bank 122 and/or the solar panels 118 to automatically curtail the carbon footprint during peak time usage. Additionally, in some examples, the recommendation engine 160 can control operations of the HVAC system of a site 102 to implement the approved plan, such as causing the HVAC system to increase or decrease the set temperature of the HVAC system during peak times and to restore the set temperature at off-peak times.

Figure 4:
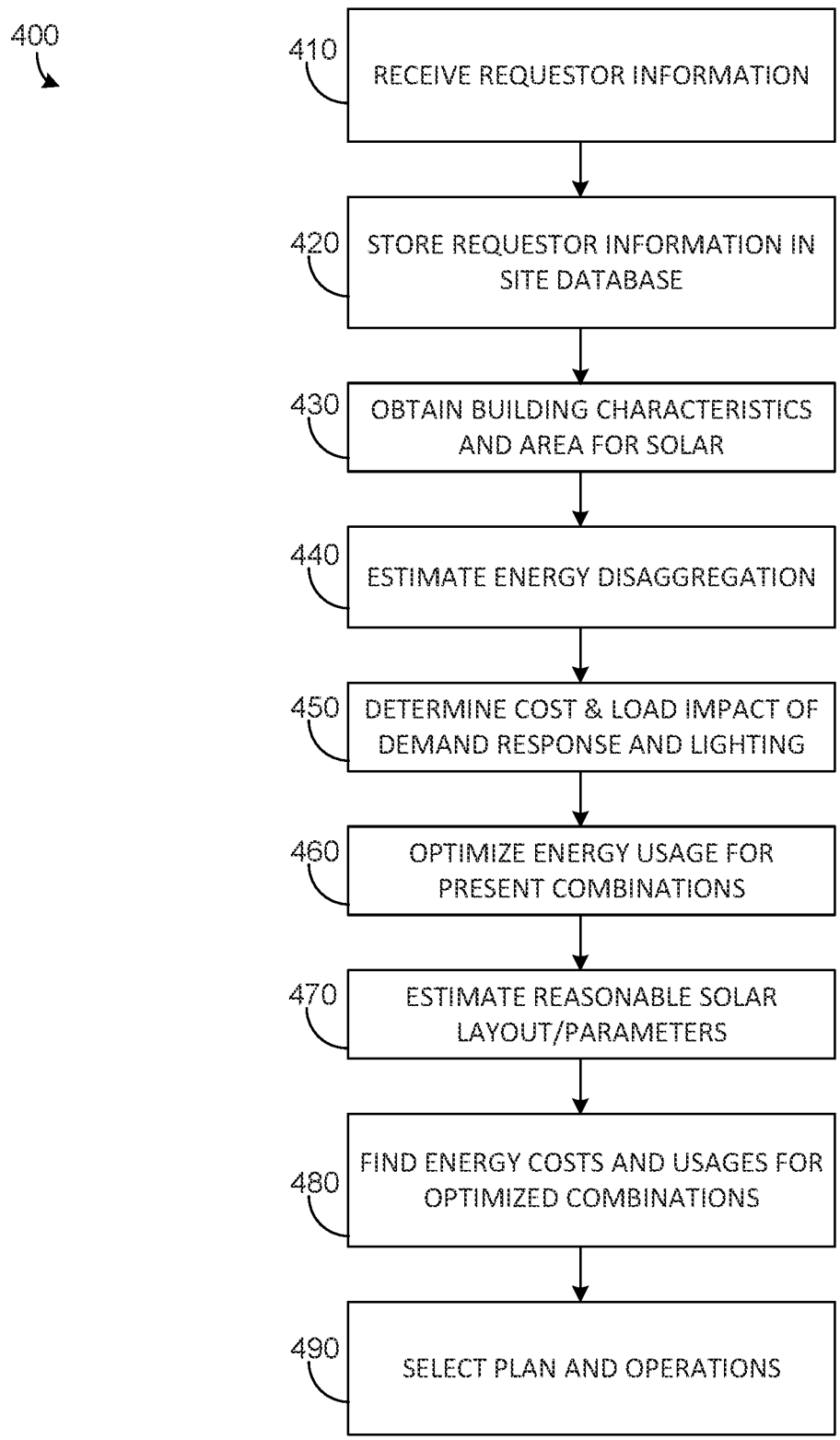
FIG. 4 illustrates a flowchart of an example method for recommending a plan to reduce a carbon footprint of a site.

In view of the foregoing structural and functional features described above, an example method will be better appreciated with reference to FIG. 4. While, for purposes of simplicity of explanation, the example method of FIG. 4 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 4 illustrates a flowchart of an example method 400 for recommending a plan to reduce a carbon footprint of a site. At 410 a remote recommendation server, such as the remote recommendation server 130 of FIG. 1, can receive a request including requestor information, such as remote requestor information 200 of FIG. 2. At 420, the remote recommendation server can store the requestor information in a site database, such as the site database 154 of FIG. 1. The site database can store the requestor information and historical data related to the site, as well as historical data related to a plurality of sites.

At 430, a recommendation engine, such as the recommendation engine 160 of FIG. 1, can obtain building characteristics of the site and an area of the site available for solar panels, such as solar panels 118 of FIG. 1. Particularly, the requestor information can include enough information to obtain building characteristics such as size of the site (e.g., size of site (square meters) 240 of FIG. 2) and the type of site (e.g., type of site 255 of FIG. 2). Therefore, the recommendation engine can have enough information about the site to determine an area available for solar panels.

At 440, the recommendation engine can estimate energy disaggregation. That is, the recommendation engine can determine which energy consuming equipment of the site are consuming energy and how much energy the equipment is consuming, as well as which power sources (e.g., the power grid 106 of FIG. 1) are providing the power consumed by the equipment. In response to estimating energy disaggregation at 440, the recommendation engine can determine a cost and load impact of demand response and lighting at 450.

At 460, the recommendation engine can recommend a plan or set of plans (e.g., plans 300 of FIG. 3) to optimize energy usage for present combinations of the site characteristics. The set of plans can be generated based on these site characteristics. Additionally, the recommendation engine can simulate execution of each of these plans and analyze the results and select a best fit plan (of the generated plans) for the site. For example, the recommendation engine can generate and simulate a plan to adjust demand response (e.g., plan to adjust demand response 310 of FIG. 3). Additionally, the recommendation engine can generate and simulate a plan to replace energy consuming equipment (e.g., replace energy consuming equipment 320 of FIG. 3), such as lighting.

At 470, the recommendation engine can estimate a reasonable solar panel layout and parameters to fulfill a plan to adjust demand response. At 480, the recommendation engine can determine energy costs and usages for generated and simulated plans including the adjusted demand response with solar panels and replacing energy consuming equipment, such as the lighting. At 490, the recommendation engine can select a plan or set of plans and operations to fulfill the selected plans.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus to provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first," or "another" element, or the equivalent thereof, it should be interpreted to include one or more than one such element, neither requiring nor excluding two or more such elements.

What is claimed:

1. A non-transitory computer readable medium storing computer readable instructions for operations that cause a processor executing the operations to:
   receive, by a remote recommendation server, a request comprising requestor information characterizing a site of a plurality of sites, the requestor information including a size of the site and type of site;
   store, in a site database, the requestor information, wherein the site database stores historical data characterizing carbon emissions of the plurality of sites over time;

receive, by a recommendation engine, the requestor information and the historical data;
estimate, by the recommendation engine, energy disaggregation to determine energy sources of power consumed at the site;
estimate, by the recommendation engine, power consumption for the site based on the historical data of one or more similarly situated sites of the plurality of sites;
generate, by the recommendation engine, a set of plans to curtail a carbon footprint of the site based on the requestor information, the energy disaggregation, and the power consumption, wherein the set of plans includes a plan to adjust a demand response by switching energy source usage from an indirect energy source to a direct energy source;
simulate, by the recommendation engine, execution of the set of plans to determine an impact on the carbon footprint for each plan;
select, by the recommendation engine, the plan of the set of plans to curtail the carbon footprint of the site based on the simulation; and
control, by the recommendation engine, a physical energy system at the site to implement the selected plan, wherein controlling includes one of discharging a battery bank to supply power during one or more peak times, activating solar panels to supply power during the peak times, adjusting a set temperature of an HVAC system during the one or more peak times, or issuing one or more commands to a controller to switch power consumption to the battery bank and the solar panels instead of a power grid during the one or more peak times.

2. The medium of claim 1, further comprising a requestor client that provides a graphical user interface (GUI) to a requestor that is configured to receive the requestor information from the requestor and provide the requestor information to the remote recommendation server.

3. The medium of claim 2, wherein the recommendation engine provides the selected plan to the requestor client via the GUI for display to the requestor, and the requestor client is configured to receive an approval input from the requestor to implement the selected plan.

4. The medium of claim 1, wherein the site of the plurality of sites is a given site and the plurality of sites comprises the one or more similarly situated sites to the given site, such that the given site and the one or more similarly situated sites are of a same type as indicated by the type of site in the requestor information.

5. The medium of claim 4, wherein the given site and the one or more similarly situated sites are of a different size and power consumed at the given site is measured per year and the power consumed at the one or more similarly situated sites is measured per hour in the historical data stored in the site database.

6. The medium of claim 5, wherein the power consumed at the one or more similarly situated sites is extrapolated to the given site to determine power consumed at the given site measured at an hourly basis adjusted for the difference in size between the given site and the one or more similarly situated sites.

7. The medium of claim 6, wherein the selected plan is a first plan, the set of plans comprising a second plan to replace energy consuming equipment at the given site and a third plan to purchase carbon offset credits to further curtail the carbon footprint.

8. The medium of claim 7, wherein the first plan includes replacing power consumed at the one or more peak times from an indirect source of power with a direct source of power by controlling the physical energy system to prioritize the battery bank instead of the power grid during the one or more peak times.

9. The medium of claim 7, wherein the first plan includes postponing operations of the energy consuming equipment from the one or more peak times to an off peak time by scheduling the energy consuming equipment via the physical energy system.

10. The medium of claim 7, wherein the set of plans comprises a fourth plan to update a power purchasing agreement to purchase generated energy from a third party to incorporate additional renewable energy sources for the site.

11. The medium of claim 1, wherein the recommendation engine further estimates the energy disaggregation by analyzing historical data of the plurality of sites to determine a proportion of power consumed by each type of energy consuming equipment at the site.

12. A system comprising:
a site of a plurality of sites comprising energy consuming equipment; and
a plurality of energy sources that impact a carbon footprint of the site, the energy sources of the site including:
direct energy sources that contribute directly to the carbon footprint of the site, the direct energy sources including fuel and a battery bank;
indirect energy sources that contribute indirectly to the carbon footprint of the site, the indirect energy sources including a power grid;
a remote recommendation server executing on a computing platform that:
provides a graphical user interface (GUI) to a requestor client; and
receives requestor information from a requestor in response to the requestor interacting with the GUI, the requestor information including a size of the site and a type of site;
a site database executing on the computing platform that stores the requestor information and historical data characterizing carbon emissions of the plurality of sites over time; and
a recommendation engine executing on the computing platform that:
estimates energy disaggregation to determine energy sources of power consumed at the site;
estimates power consumption for the site based on the historical data of one or more similarly situated sites of the plurality of sites;
generates a set of plans to curtail the carbon footprint of the site based on the requestor information, the energy disaggregation, and the power consumption, wherein the set of plans includes a plan to adjust a demand response by switching power consumption from an indirect energy source to a direct energy source;
simulates execution of a set of plans to determine an impact on the carbon footprint for each plan
selects the plan of the set of plans to curtail the carbon footprint of the site; and
controls a physical energy system at the site to implement the selected plan, wherein to control the physical energy system includes one of the battery bank being discharged to supply power during one or more peak times, solar panels being activated to supply power during the one or more peak times, a set temperature of an HVAC system being activated during the one or more peak times, or one or more commands being issued to a controller to switch power consumption to prioritize the battery bank and the solar panels instead of the power grid during the one or more peak times.

13. The system of claim 12, wherein the site of the plurality of sites is a given site and the plurality of sites comprise the one or more similarly situated sites to the given site, such that the given site and the one or more similarly situated sites are of a same type as indicated by the type of site in the requestor information.

14. The system of claim 13, wherein the given site and the one or more similarly situated sites are of a different size and power consumed at the given site is measured per year and the power consumed at the one or more similarly situated sites is measured per hour in the historical data stored in the site database.

15. The system of claim 14, wherein the power consumed at the one or more similarly situated sites is extrapolated to the given site to determine power consumed at the given site measured at an hourly basis adjusted for the difference in size between the given site and the one or more similarly situated sites.

16. The system of claim 15, wherein the plan is a first plan, and the set of plans comprise a second plan to replace the energy consuming equipment at the given site and a third plan to purchase carbon offset credits to further curtail the carbon footprint.

17. The system of claim 16, wherein the first plan includes replacing power consumed at the one or more peak times from an indirect source of power with a direct source of power by controlling the physical energy system to prioritize the battery bank instead of the power grid during the peak time.

18. A method for determining a plan to curtail a carbon footprint, the method comprising:
receiving, by a remote recommendation server executing on a computing platform, a request comprising requestor information characterizing a site from a requestor client, the requestor information including a size of the site and a type of site;
storing, by the remote recommendation server, the requestor information in a site database that stores historical data characterizing carbon emissions of a plurality of sites over time;
obtaining, by a recommendation engine executing on the computing platform, building characteristics of the site from requestor information stored in the site database;
estimating, by the recommendation engine, energy disaggregation to determine energy sources of power consumed at the site;
determining, by the recommendation engine, a cost and load impact of demand response and energy consuming equipment at the site;
estimating, by the recommendation engine, power consumption for the site based on the historical data of one or more similarly situated sites of the plurality of sites;
generating, by the recommendation engine, a set of plans characterizing energy use of the energy consuming equipment at the site to curtail a carbon footprint of the site based on the requestor information, the energy disaggregation, the demand response and the power consumption, wherein the set of plans includes a plan to adjust a demand response by switching power consumption from an indirect energy source to a direct energy source;
simulating, by the recommendation engine, execution of the set of plans at the site to determine an impact on the carbon footprint for each plan;
estimating, by the recommendation engine, a solar panel layout and parameters;
determining, by the recommendation engine, energy costs and usages of the site in response to curtail energy use of the energy consuming equipment at the site;
selecting, by the recommendation engine, the plan of the set of plans to curtail the carbon footprint of the site; and
controlling, by the recommendation engine, a physical energy system at the site to implement the selected plan, wherein controlling the physical energy system includes one of discharging a battery bank to supply power during one or more peak times, activating solar panels to supply power during the peak times, adjusting a set temperature of an HVAC system during the one or more peak times, or issuing one or more commands to a controller to switch power consumption to prioritize the battery bank and the solar panels instead of a power grid during the one or more peak times.

19. The method of claim 18, wherein the plan is a first plan, and the set of plans comprise a second plan to replace the energy consuming equipment at the site and a third plan to purchase carbon offset credits to further curtail the carbon footprint.

20. The method of claim 19, wherein the first plan includes replacing power consumed at the one or more peak times from an indirect source of power with a direct source of power by controlling the physical energy system to prioritize the battery bank instead of the power grid during the one or more peak times.

* * * * *